Patented June 7, 1949

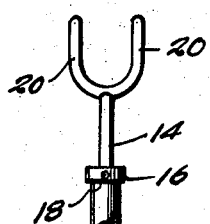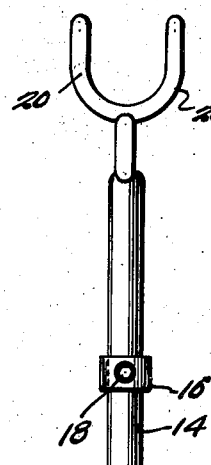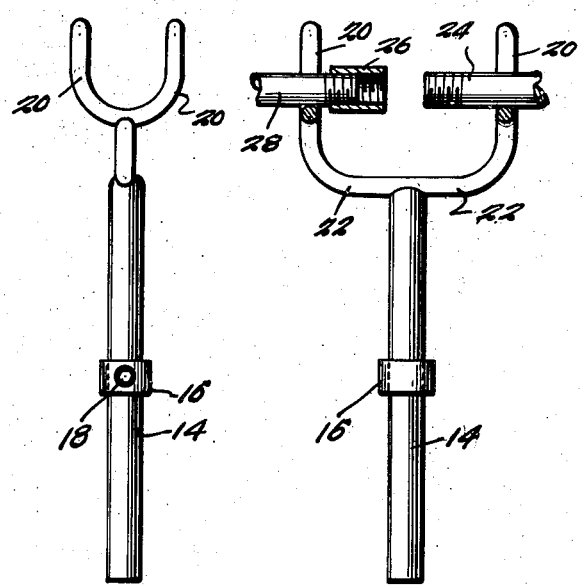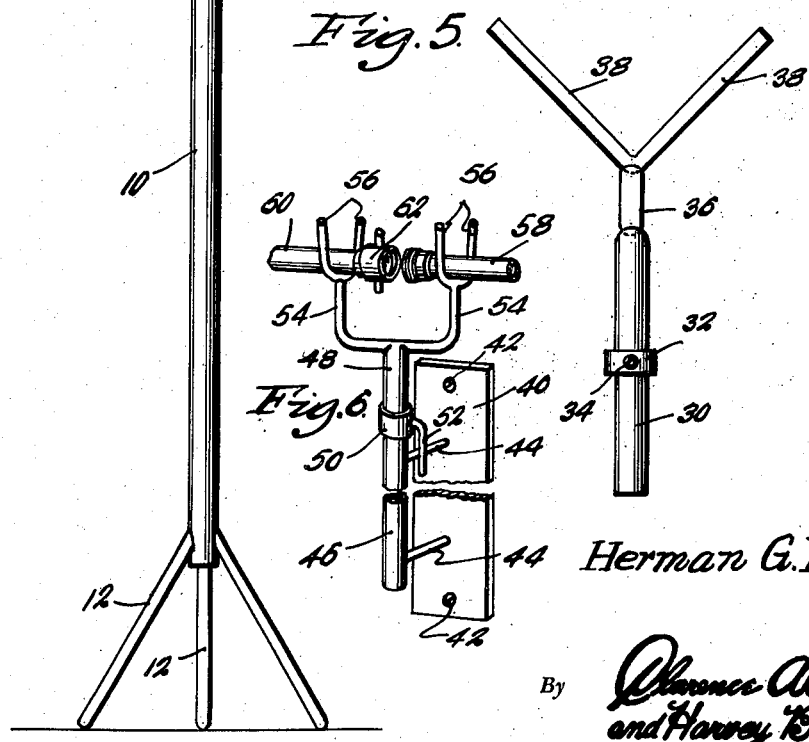

2,472,654

UNITED STATES PATENT OFFICE 2,472,654

PIPE-LINE SUPPORT

Herman G. Engelke, West Bend, Wis., assignor to Engelke Engineering, Incorporated, Hartford, Wis., a corporation of Wisconsin Application November 1, 1946, Serial No. 707,238

3 Claims. (Cl. 248—161)

1

This invention relates to novel and useful improvements in a pipe line support and more particularly has reference to a supporting means for positioning the adjacent ends of a pipe line in alignment in order to facilitate the coupling and uncoupling of the pipe line sections.

The principal objects of the present invention reside in providing a pipe line support which is of lightweight construction, durable, portable, easily adjusted as to vertical height, and which has novel support means for positioning the adjacent ends of pipe sections in alignment with each other to facilitate their coupling or uncoupling.

These, together with various ancillary objects of the invention which will later become apparent as the following description proceeds, are realized by the present device, the principles of which have been illustrated, by way of example only in the accompanying drawings, wherein:

Figure 1 is an elevational view of one form of the device, parts being shown in section for greater clarity of detail;

Figure 2 is an enlarged elevational view of the supporting head employed in the device of Figure 1;

Figure 3 is an elevational view taken at right angles to Figure 2 of the supporting head;

Figure 4 is a horizontal sectional detail view of a fastening means employed with the device;

Figure 5 is an elevational view of the modified form of the support head; and,

Figure 6 is a perspective view of a further modified form of the device.

Referring now more particularly to the accompanying drawings, wherein like numerals indicate similar parts throughout the several views, reference is made first to the form of the invention disclosed in Figures 1–4, and wherein 10 designates a vertical pillar, preferably of tubular metallic construction and which is provided with a plurality of supporting legs 12 rigidly secured to the lower end thereof. At its upper end, the tubular pillar 10 slidingly receives the depending supporting rod 14 of a supporting head, upon which rod 14 is vertically adjustable, a collar 16 having a set screw 18 for rigidly securing the collar in adjusted position upon the rod 14. Surmounting the rod 14, is a forked pipe supporting head having a pair of upwardly extending spaced arms 20, constituting a yoke for receiving a pipe therebetween. As shown more clearly in Figure 3, the yoke arms 20 are disposed in aligned pairs and supported upon laterally extending support arms 22 carried by the upper end of the support rod 14. The use of the device as illustrated in Figure 3, which shows a pair of aligned pipe sections 24 and 28 and which are adapted to be coupled or united as by a coupling means 26, being supported and retained in aligned position in order to attain access thereto for convenient manipulation of the coupling 26.

Attention is now directed to the modified form of Figure 5, wherein the supporting rod 30 is provided with an adjustable collar 32 having a set screw 34, and from the upper end of which extends laterally and upwardly support arms 36 corresponding to the arms 22 in the modification above described. As so far disclosed, this construction is identical with the preceding modification, that the support arms 36 carry upwardly extending pairs of V-shaped pipe supporting arms 38 which are arranged in pairs corresponding to the pairs 20 of the preceding embodiment.

For a further form of the invention, attention is now directed to Figure 6, wherein there is disclosed a base plate 40 constituting a bracket which is retained as by screws 42 within the supporting surface of any suitable character. A pair of laterally extending rods 44 are carried by the plate 40 and serve to rigidly support as by being welded thereto, a tubular pillar 46 which slidably receives in the upper end thereof a support rod 48 retained in vertical adjustment by a collar 50 which is provided with a depending hook 52 adapted to engage one of the support pins 44 to more firmly retain the supporting head 48 upon the device. The supporting rod 48 has laterally and upwardly extending support arms 54 which at their upper ends terminate in forked or bifurcated portions 56 constituting aligned support means for positioning a pair of pipe sections 58 and 60 in juxtaposed and longitudinally aligned relation, for convenient manipulation of a conventional coupler 62.

From the foregoing, it is believed that the construction of the device will be readily apparent. The device is intended for use with pipe installations and systems such as the piping systems of dairy farms and the like which necessitate or are required by law to be periodically removed and thoroughly sterilized or cleansed and then reassembled. In such use, the portable fastening elements of this invention may be readily applied where needed in order to support and retain the various sections of pipe in their disassembled relation, and permit their quick and ready assembly.

Since various embodiments of the invention will be readily apparent to those skilled in the art, it is to be understood that the invention is not limited to the exact construction shown, but that all suitable modifications falling within the scope of the appended claims may be employed.

I claim:

1. A pipe line support including a pillar, support means for said pillar, a support head detachably carried by said pillar, said support head comprising a rod telescopingly engaging said pillar, fastening means for adjustably securing said support head upon said pillar, a pipe line support fork on said support head, said support means including a bracket and an attaching means securing said pillar to said bracket, said last means including a depending hook engaging said bracket attaching means.

2. A pipe line support including a pillar, support means for said pillar, a support head detachably carried by said pillar, said support head comprising a rod telescopingly engaging said pillar, fastening means for adjustably securing said support head upon said pillar, a pipe line support fork on said support head, said support means including a bracket and an attaching means securing said pillar to said bracket, said attaching means including a pair of transverse pins, said fastening means including a collar and a depending hook, one end of said hook being mounted on said collar to rigidly retain it on said rod, the other end of said hook engaging a transverse pin to firmly retain the rod in vertical position.

3. The combination of claim 2 wherein said support head includes a pair of parallel, upwardly extending bifurcated arms.

HERMAN G. ENGELKE.

REFERENCES CITED

The following references are of record in the file of this patent:

UNITED STATES PATENTS

| Number | Name | Date |
|---|---|---|
| 764,491 | Newlove | July 5, 1904 |
| 1,131,699 | Hoecker et al. | Mar. 16, 1915 |
| 1,833,781 | Fuller | Nov. 24, 1931 |